2,972,163

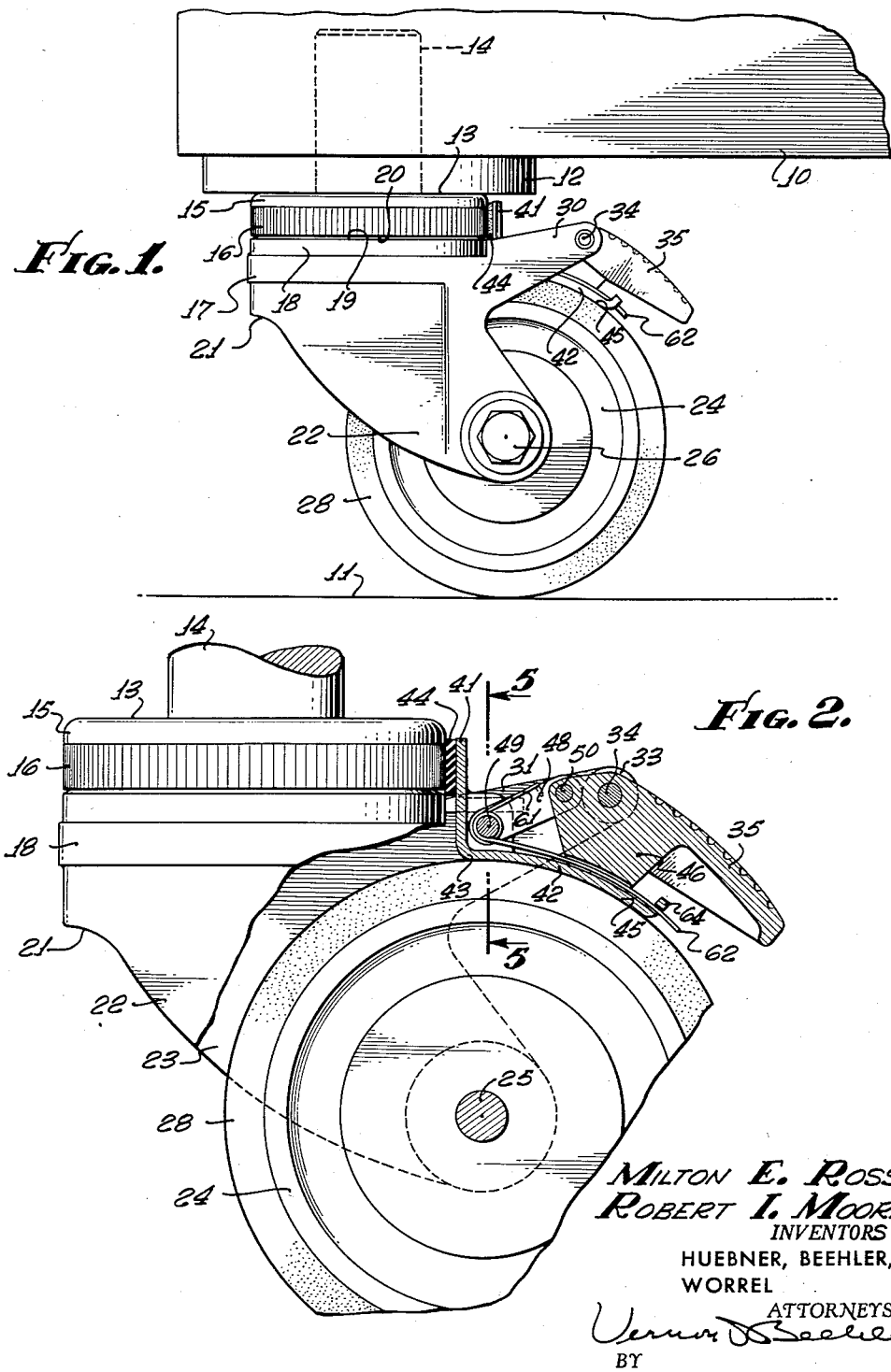

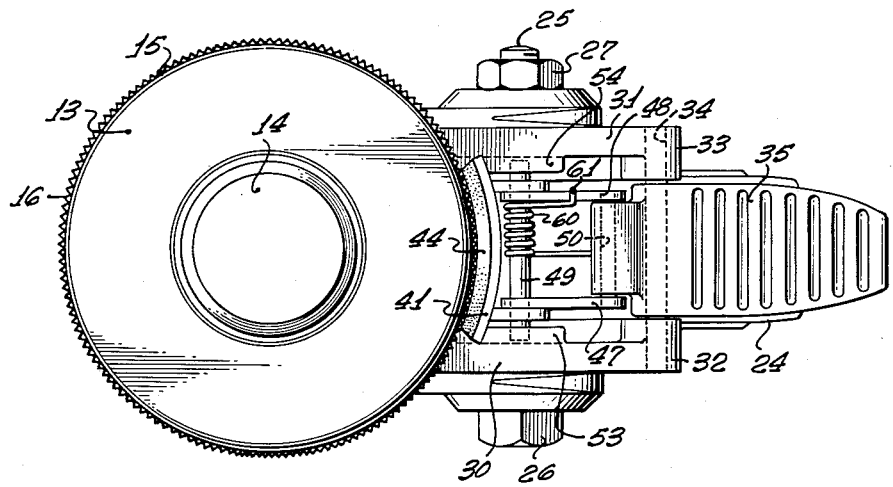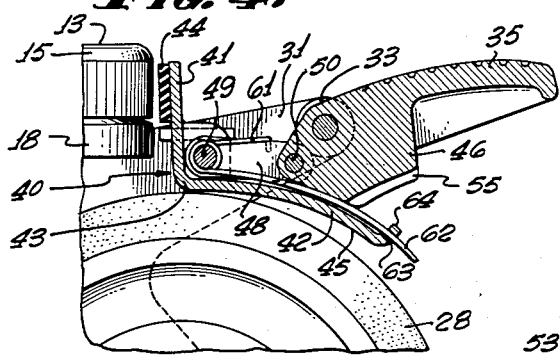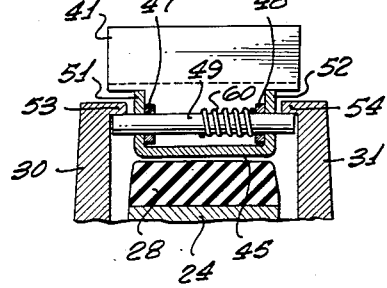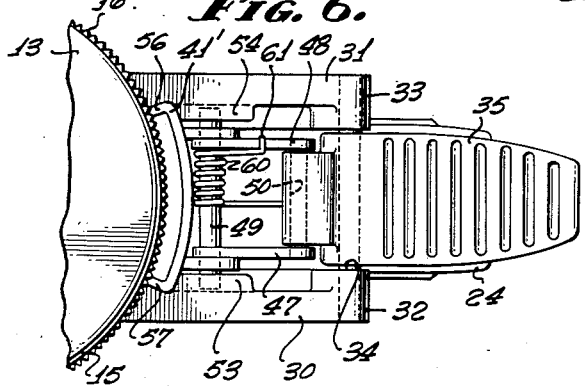
MILTON E. ROSS
ROBERT I. MOORE
INVENTORS
HUEBNER, BEEHLER, & WORREL
ATTORNEYS United States Patent Office 2,972,163
Patented Feb. 21, 1961

SWIVEL LOCK AND WHEEL BRAKE

Milton E. Ross, Burbank, and Robert I. Moore, North Hollywood, Calif., assignors to Aerol Co., Inc., Los Angeles, Calif., a corporation of California Filed July 26, 1957, Ser. No. 674,509

4 Claims. (Cl. 16—35)

The invention relates to braking devices and has particular reference to a braking device commonly designated a floor brake by means of which a caster wheel is locked in braking position in order to hold still the vehicle which is supported by the wheel.

The invention has special reference to swivel caster wheels whereby there may be provided a combined braking effect on both the wheel and the swivelling of the device.

During the past decade a considerable amount of development activity has been directed toward providing adequate caster wheels for sundry carriages and vehicles designed to carry relatively heavy loads over floor surfaces in manufacturing and industrial establishments where because of the rugged use the wheels need to be well constructed so as to support excessive wear. This development activity has included wheel mounts, bearings and particularly the wheel construction wherein the more demanding needs have had to be met. Although parking brakes and floor brakes have been provided, many of these have followed substantially conventional practices and while capable of locking the wheels in fixed position have had sundry drawbacks which have affected their usefulness. In some instances levers and treadles have been made to extend unduly far out from the vehicle in a position to be tripped over, struck, bent and broken. In most instances the braking effect has been confined to the wheel alone without due attention being given to the locking of the swivel mount. On many occasions where mechanisms thus constructed have been inadequate, resort has been had to a floor brake entirely independent of the wheel by use of which some friction pad or other is extended from the body of the vehicle to the floor thereby to elevate the body slightly from its load upon the wheels and thus to provide a parking brake effect.

It is therefore among the objects of the invention to provide a new and improved parking brake for swivel caster wheels which is capable of locking the swivel effect at the same time that a braking force is applied to the wheel.

Another object of the invention is to provide a new and improved combined swivel lock and wheel brake which is capable of being applied simultaneously and subsequently released simultaneously.

Still another object of the invention is to provide a new and improved parking brake and swivel lock which when in released position has the brake shoes or brake arms yieldably retained in released position so that there is no inadvertent partial braking effect.

Still another object of the invention is to provide a new and improved parking brake which is compact in its construction and arrangement such that the treadle lever lies at all times immediately adjacent the wheel tread and is capable of being shifted about with the wheel so as to be always in a potential braking position against the wheel or against the swivel movement or against both.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a side elevational view of a swivel caster wheel device attached to the underside of a carriage and equipped with the brake device.

Figure 2 is an elevational view partially in section showing the brake mechanism.

Figure 3 is a plan view.

Figure 4 is a fragmentary vertical sectional view showing the brake in released condition.

Figure 5 is a cross-sectional view taken on the line 5—5 of Figure 2.

Figure 6 is an enlarged plan view of the brake portion of the device showing a slightly different modified form of brake.

In an embodiment of the invention chosen for the purpose of illustration there is shown a carriage 10 which may be virtually any type of cart or truck adapted for the transportation of sundry materials over a floor surface 11. A corner block 12 assists in providing a firm mounting for a base 13 from which a shaft 14 extends upwardly through the block and is secured at the corner of the carriage. At the lower end of the base is an annular plate 15 having a roughened or serrated cylindrical perimeter 16.

Swivelly mounted upon the plate and base, following substantially conventional swivel mounting practice, is a chassis 17 at the upper portion of which is a disc 18, an upper surface 19 of which is in face to face position against a surface 20 of the plate 15.

The lower portion of the chassis comprises a fork 21 consisting of downwardly extending legs 22 and 23. Between the legs a wheel 24 is rotatably mounted upon an axle 25, the axle being held in place by nuts 26 and 27. In the chosen embodiment the wheel is provided with a rubber tread portion 28.

Also on the chassis is a pair of laterally spaced brackets 30 and 31 which extend outwardly and slightly upwardly so that the ends of the brackets clear the outermost perimeter of the tread 28 by a substantial amount. Bosses 32 and 33 on the brackets provide means for securing a pin 34 on which is mounted a treadle lever 35.

To provide a braking effect a brake member 40 is employed which consists of an upwardly extending brake arm 41 and a somewhat downwardly and outwardly extending brake arm 42, the arms being joined at a corner 43 at a substantially right angle. On the arm 41 is a brake shoe 44 which is adapted to engage the roughened perimeter 16. On the arm 42 is a shoe surface 45 which in the present embodiment, being for the purpose of engaging a rubber tread 28, may be of metal.

To impress the brake member into locking and braking position, the treadle is provided with a boss or block 46. To provide an over-center mechanism to lock the brake member in braking position, links 47 and 48 are connected at one end to a pin 49 and at the other end to a pin 50. The pin 50 in turn is secured to the left end of the boss 46, as viewed in Figures 2 and 4. The pin 49, as best shown in Figure 5, is secured in side walls 51 and 52 of the brake member and extends outwardly therefrom so as to underlie flanges 53 and 54 of the brackets 30 and 31.

The treadle lever 35 and brake member 40 is shown in released position in Figure 4. When the brake is to be applied, the treadle lever 35 is depressed, causing the boss 46 at a corner 55 thereof to cam downwardly against the brake arm 42. At the same time pressure is exerted through the pin 50 upon the links 47 and 48 and these acting through the pin 49 force the brake arm 41 laterally until the shoe 44 engages the roughened perimeter 16. In braking position the parts are as illustrated in Figures 1, 2 and 3. In this position the over-center position of the pin 50 serves to lock the brake arms in braking position.

When the brake is to be released, the treadle lever 35 is elevated. This removes the boss 46 from its position of engagement with the brake arm 42. At the same time pull is exerted upon the links 47 and 48 and the pin 49 is drawn from left to right, as viewed in Figures 2 and 4, sliding under the flanges 53 and 54 which hold it down. The brake arm 41 thus moves away from the perimeter 16 and the locking of the swivel is released at the same time that the brake arm 42 is released from engagement with the tread of the wheel.

In a slightly modified form of the device a brake arm 41', as shown in Figure 6, may be provided with fingers 56 and 57 shaped to engage the roughened perimeter 16 at any one of the positions of roughness. In this form of the device there is a degree of resiliency built into the arm 41' sufficient to add an amount of spring tension, thereby holding the parts in their locking position until released in the manner heretofore described.

As a further aid in the effectiveness of operation of the device, a spring 60 is wound about the pin 49. One extension 61 of the spring bears downwardly against the link 48. A second extension 62 protrudes through a hole 63 in a flange 64 at the outermost end of the brake arm 42. The spring is so biased that in released position of the brake parts the spring will maintain the brake arms in released position and prevent a tilting of the brake and inadvertent casual contact of either of the brake arms with the wheel in one instance and the cylindrical perimeter 16 in the other.

It will be understood from the foregoing description that a compact positive-acting combined lock and brake is provided which is located in alignment with the wheel to which it is applied and which will follow the course of the wheel as the carriage on which the wheel is mounted is moved about. Hence the treadle will regularly be in a position readily available for manipulation either applying or releasing the brake and the swivel lock. The parts are rugged but compact and serve as an effective anchor whenever needed.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. In a swivel caster wheel a base comprising a mounting element and a horizontal circular plate thereon having a roughened peripheral brake surface, a chassis having a swivel mounting on said base and comprising a horizontal disc in face to face rotational engagement with said plate, a wheel support on the chassis and a wheel rotatably mounted thereon, a treadle lever having a pivotal connection to said chassis, a brake member comprising one brake arm having a brake shoe adjacent to and adapted to engage said brake surface of the plate, a second brake arm having a fixed connection to the first arm at an angle and having a shoe adjacent to and adapted to engage the tread of said wheel, a link pivotally connected at one end to the brake member at the inside of the fixed connection of said arms and at the other end having a pivotal connection to the treadle lever, a boss on the lever having a position of abutment against said second arm when said pivotal connection of the link to the treadle lever is over-center relative to the other two pivotal connections, both said brake arms being in braking positions respectively against said plate and said wheel during said over-center position, said brake arms having released positions when said treadle lever is changed to a position released from over-center position.

2. In a swivel caster wheel a base comprising a mounting element and a horizontal circular plate thereon having a roughened peripheral brake surface, a chassis having a swivel mounting on said base and comprising a horizontal disc in face to face rotational engagement with said plate, a wheel support on the chassis and a wheel rotatably mounted thereon, a treadle lever having a pivotal connection to said chassis, a brake member comprising one brake arm having a brake shoe adjacent to and adapted to engage said brake surface of the plate, a second brake arm having a fixed connection to the first arm in an angular relationship and having a shoe adjacent to and adapted to engage the tread of said wheel, a link pivotally connected at one end to the brake member at the inside of the fixed connection of said arms and at the other end having a pivotal connection to the treadle lever, a boss on the lever having a position of abutment against said second arm when said pivotal connection of the link to the treadle lever is over-center relative to the other two pivotal connections, both said brake arms being in braking positions respectively against said plate and said wheel during said over-center position, said braking member being of resilient material whereby said brake arms are yieldably joined at said fixed connection, said brake arms having released positions when said treadle lever is changed to a position released from over-center position.

3. In a swivel caster wheel a base comprising a mounting element and a horizontal circular plate thereon having a peripheral friction brake surface, a chassis swivelly secured on said base and comprising a horizontal disc in face to face rotational engagement with said plate, a fork on the chassis having downwardly and outwardly extending laterally spaced legs and a wheel rotatably mounted between said legs, a pair of laterally spaced transversely extending brackets on said fork, a treadle lever overlying a tread portion of the wheel, a first pin pivotally connecting the lever to and between said brackets, a brake member comprising one brake arm having a brake shoe adjacent to and curved to fit said brake surface of the plate, a second brake arm having a fixed connection to the first arm at an angle and having a shoe curved to correspond to a brake surface at the tread of said wheel, a third pin connected to the brake member adjacent a third pin connected to the brake member adjacent the inside of the fixed connection of said brake arms and extending parallel to said first pin, a second pin on the treadle lever extending between and parallel to the first and third pins, a link pivotally connected by said second and third pins to the lever and brake member respectively, a boss on the treadle lever having a position of abutment against said second arm when said second pin is over-center relative to said first and third pins and wherein both said brake arms are in braking positions respectively against said brake surface and said wheel, said brake arms being drawn to and maintained in released positions when said treadle lever is lifted to a position elevating said boss from said second brake arm, and a spring in engagement with said link and said second brake arm biased to restrain said brake member from tilting against either of said brake surfaces in released position.

4. A swivel caster wheel for a portable object, comprising a base adapted to be fixed on the underside of the object, the base having an under surface which becomes disposed in a horizontal plane when the base is secured to said object, the base having a circumferential annular edge surface the axis of which extends vertically when the base is secured to said object, said annular edge surface being a first brake surface, a chassis swivelly secured on the base and having a disc portion facing toward and being rotatable with respect to said under surface, the chassis having a wheel support portion and a wheel rotatably mounted thereon for rotation with the axis of the wheel extending horizontally, the curcumference of the wheel being a second brake surface, a treadle lever positioned radially outwardly of the wheel circumference and being pivotally mounted by a first pivotal connection on the chassis for swinging on its pivot in a vertical direction, a brake member having one brake arm disposed between the treadle lever and said base and adapted to engage said annular edge surface when the treadle lever is swung on its pivot to a braking position, the brake member having another brake arm connected to said one brake arm and disposed between the treadle lever and the wheel circumference and adapted to engage the wheel circumference when the treadle lever is moved to its braking position, a rigid link having a second pivotal connection at one end thereof to the treadle lever and having a third pivotal connection at its other end to the brake member, said second pivotal connection being disposed between said first and third pivotal connections, the treadle lever being engageable with the brake member to move the brake member into engagement with said brake surfaces when the treadle lever is moved to the braking position, the treadle lever being swingable on its pivotal connections to a released position wherein the brake member is drawn by the link out of engagement with said braking surfaces, said second pivotal connection being disposed radially outwardly with respect to the wheel from a line drawn between said first and third pivotal connections in a direction generally intersecting said first and second brake surfaces when in braking position, and said second pivotal connection being disposed radially inwardly with respect to the wheel from said line when in released position.

References Cited in the file of this patent

UNITED STATES PATENTS

| | | |
|---|---|---|
| 496,268 | Mason | Apr. 25, 1893 |
| 506,504 | Hollis | Oct. 10, 1893 |
| 2,345,442 | Winter et al. | Mar. 28, 1944 |
| 2,591,524 | Douglas | Apr. 1, 1952 |
| 2,709,828 | Noelting et al. | June 7, 1955 |

FOREIGN PATENTS

| | | |
|---|---|---|
| 743,438 | Great Britain | Jan. 18, 1956 |